(12) United States Patent
Lee et al.

(10) Patent No.: US 9,901,816 B2
(45) Date of Patent: Feb. 27, 2018

(54) INTERACTIVE GAME SYSTEM WITH AN HMD AND A GROUND PAD

(71) Applicant: HTC Corporation, Taoyuan (TW)

(72) Inventors: Yu-Cheng Lee, Taoyuan (TW); Chung-Ying Yeh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 113 days.

(21) Appl. No.: 15/195,599

(22) Filed: Jun. 28, 2016

(65) Prior Publication Data

US 2017/0056760 A1 Mar. 2, 2017

Related U.S. Application Data

(60) Provisional application No. 62/208,926, filed on Aug. 24, 2015.

(51) Int. Cl.
| | | |
|---|---|---|
| *A63F 13/212* | (2014.01) | |
| *A63F 13/214* | (2014.01) | |
| *A63F 13/213* | (2014.01) | |
| *A63F 13/25* | (2014.01) | |
| *A63F 13/218* | (2014.01) | |
| *A63F 13/98* | (2014.01) | |

(52) U.S. Cl.
CPC .......... *A63F 13/214* (2014.09); *A63F 13/212* (2014.09); *A63F 13/213* (2014.09); *A63F 13/218* (2014.09); *A63F 13/25* (2014.09); *A63F 13/98* (2014.09)

(58) Field of Classification Search
CPC .... A63F 13/212–13/214; A63F 13/218; A63F 13/25; H02J 7/02; H04W 68/00
See application file for complete search history.

(56) References Cited

U.S. PATENT DOCUMENTS

| | | | | |
|---|---|---|---|---|
| 8,963,956 B2* | 2/2015 | Latta | ......................... | G09G 5/00 |
| | | | | 345/633 |
| 9,418,551 B2* | 8/2016 | Kavaler | ................. | G08G 1/142 |
| 9,444,279 B1* | 9/2016 | Brown | ................... | H02J 7/0047 |
| 9,509,169 B2* | 11/2016 | Park | ........................ | H02J 7/025 |
| 2007/0132785 A1* | 6/2007 | Ebersole, Jr. | ........... | A63F 13/06 |
| | | | | 345/633 |
| 2012/0052923 A1* | 3/2012 | Park | ...................... | H01M 10/44 |
| | | | | 455/567 |

(Continued)

*Primary Examiner* — Jason Skaarup
(74) *Attorney, Agent, or Firm* — Birch, Stewart, Kolasch & Birch, LLP

(57) ABSTRACT

An interactive game system is provided. The interactive game system includes a head-mounted device (HMD), a game suit, a battery and a ground pad. The HMD executes a virtual reality program and displays video information of the virtual reality program to a user. The game suit is worn by the user and connected to the HMD. The game suit includes wireless sensors. The battery provides power to the HMD. The ground pad includes wireless charging devices arranged in a matrix to provide power. When the wireless charging device detects an approaching wireless sensor, the position information of the wireless charging device is transmitted to the approaching wireless sensor and a signal indicating whether the battery needs to be charged is transmitted to the wireless charging device. If the battery needs to be charged, the wireless charging device charges the battery via the approaching wireless sensor.

20 Claims, 13 Drawing Sheets

(56) References Cited

U.S. PATENT DOCUMENTS

| | | | | |
|---|---|---|---|---|
| 2012/0115549 | A1* | 5/2012 | Kim | H02J 7/0047 |
| | | | | 455/566 |
| 2012/0214462 | A1* | 8/2012 | Chu | H04M 19/04 |
| | | | | 455/418 |
| 2013/0304583 | A1* | 11/2013 | Han | G06Q 30/0267 |
| | | | | 705/14.64 |
| 2014/0218361 | A1* | 8/2014 | Abe | G06T 19/006 |
| | | | | 345/424 |
| 2014/0364208 | A1* | 12/2014 | Perry | A63F 13/00 |
| | | | | 463/31 |
| 2014/0364212 | A1* | 12/2014 | Osman | A63F 13/213 |
| | | | | 463/31 |
| 2015/0094142 | A1* | 4/2015 | Stafford | A63F 13/212 |
| | | | | 463/31 |
| 2015/0326027 | A1* | 11/2015 | Leabman | H04W 12/08 |
| | | | | 307/104 |
| 2016/0054837 | A1* | 2/2016 | Stafford | A63F 13/825 |
| | | | | 463/33 |
| 2016/0095083 | A1* | 3/2016 | Park | H04M 1/72597 |
| | | | | 455/458 |
| 2016/0187974 | A1* | 6/2016 | Mallinson | G06F 3/014 |
| | | | | 463/32 |
| 2016/0292924 | A1* | 10/2016 | Balachandreswaran | |
| | | | | G06T 19/006 |
| 2016/0361627 | A1* | 12/2016 | Fujita | A63F 13/23 |

* cited by examiner

INTERACTIVE GAME SYSTEM WITH AN HMD AND A GROUND PAD

CROSS REFERENCE TO RELATED APPLICATION

The present application is based on, and claims priority from, U.S. Application No. 62/208,926, filed on Aug. 24, 2015, the invention of which is hereby incorporated by reference herein in its entirety.

TECHNICAL FIELD

The invention relates to an interactive game system, and more particularly to an interactive game system with an HMD (Head-Mounted Device) and a ground pad.

BACKGROUND

What we actually see in real life is composed of visual images, but it is not as easy to provide that same experience when it comes to the presentation of visual images or scenes of a video game. Even though the growth of computer technology has made it possible to create three-dimensional virtual scenes in a display device, the user experience is still far removed from the deep immersion required to be analogous to the experience of reality. Simply speaking, a user can only watch three-dimensional virtual scenes, and cannot experience the three-dimensional virtual scenes.

Computer-based home video game machines have been highly successful because they can interactively produce exciting video graphics. The user can control characters in the video game by use of a handheld joystick. However, these video games are generally operated in two-dimensions, and these 2D video games still cannot provide the realism offered by a three-dimensional graphics system.

3D graphics are fundamentally different from 2D graphics. In 3D graphics techniques, a "world" is represented in three-dimensional space. The system can allow the user to select a viewpoint within the world. The system creates an image by "projecting" the world based on the selected viewpoint. The result is a true three-dimensional image having depth and realism. However, the experience of the 3D video game using 3D graphics techniques is still far from the actual experience of reality. The proposed innovation provides a new experience of virtually realistic interactions by using the proposed technologies.

SUMMARY

An embodiment of the present invention provides an interactive game system. The interactive game system comprises a head-mounted device, a game suit, a battery and a ground pad. The head-mounted device is worn by a user, wherein the head-mounted device executes a virtual reality program and displays video information of the virtual reality program to the user. The game suit is worn by the user and connected to the head-mounted device. The game suit comprises a plurality of wireless sensors which are embedded on foot regions of the game suit and capable of receiving power. The battery is embedded on the game suit and used to provide power to the head-mounted device. The ground pad comprises a plurality of wireless charging devices that are arranged in a matrix and connected to a power outlet to provide power, wherein when the wireless charging device detects an approaching wireless sensor, the position information of the wireless charging device is transmitted to the wireless sensor and a signal indicating whether the battery needs to be charged is transmitted to the wireless charging device; wherein if the battery needs to be charged, the wireless charging device charges the battery via the wireless sensor.

An embodiment of the present invention provides a game suit that is interactive with a virtual reality program. The virtual reality program is executed by a head-mounted device worn by a user. The game suit comprises a plurality of wireless power receivers and a battery. The wireless power receivers are embedded on a foot region of the game suit and capable of receiving power from near-by wireless charging devices. The battery is connected to the wireless power receivers and used for providing power to the head-mounted device, wherein when the wireless power receivers receive position information of the near-by wireless charging devices, a signal indicating whether the battery needs to be charged is transmitted to the near-by wireless charging devices; wherein if the battery needs to be charged, the near-by wireless charging devices charge the battery via the wireless power receivers.

An embodiment of the present invention provides a ground pad for providing power to a game suit worn by a user, wherein the game suit is interactive with a virtual reality program executed by a head-mounted device worn by the user. The ground pad comprises a plurality of wireless charging devices that are arranged in a matrix and connected to a power outlet to provide power, wherein the wireless charging device detects whether wireless sensors embedded on foot regions of the game suit are approaching or not; wherein when the wireless charging device detects that wireless sensors of the game suit are approaching, the wireless charging device transmits its position information to the approaching wireless sensors and receives a signal indicating whether the battery of the game suit needs to be charged from the approaching wireless sensors; wherein if the battery needs to be charged, the wireless charging device charges the battery via the approaching wireless sensors.

BRIEF DESCRIPTION OF THE DRAWINGS

The present invention can be more fully understood by reading the subsequent detailed description and examples with references made to the accompanying drawings, wherein.

DETAILED DESCRIPTION

The following description is of the best-contemplated mode of carrying out the present invention. This description is made for the purpose of illustrating the general principles of the present invention and should not be taken in a limiting sense. The scope of the present invention is best determined by reference to the appended claims.

Figure 1:
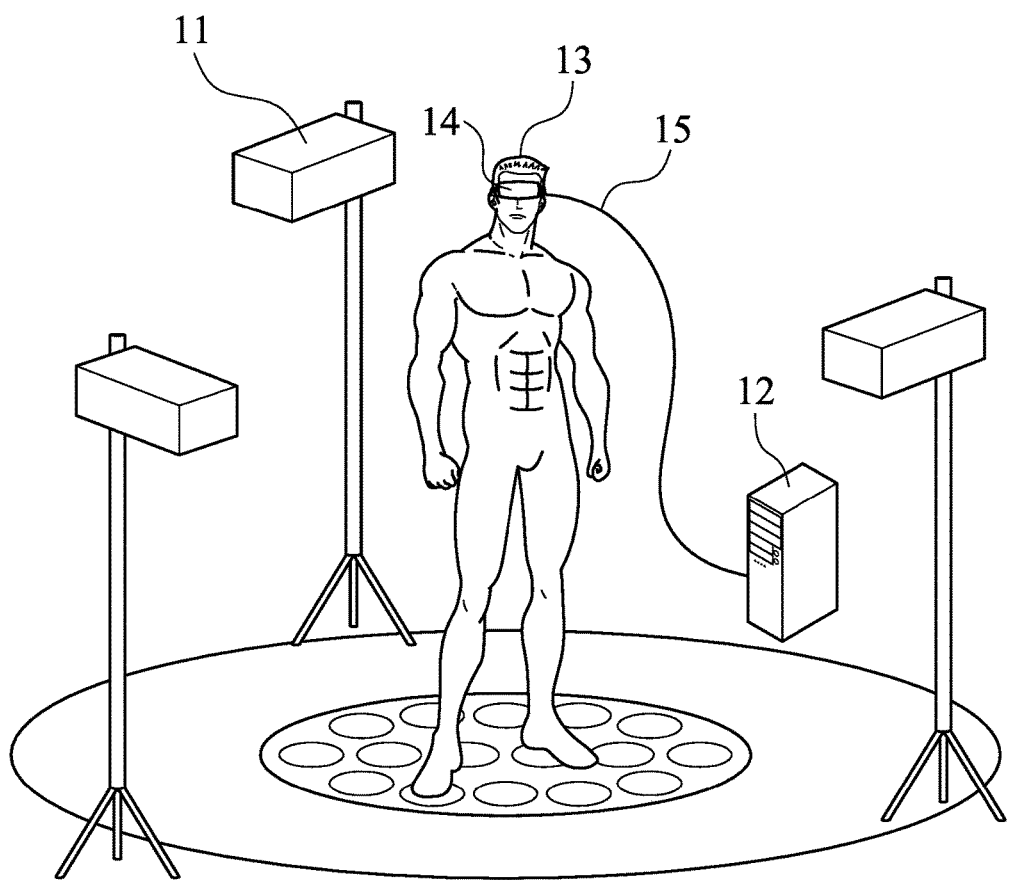
FIG. 1 is a schematic diagram showing an interactive game system 10 according to an embodiment of the present disclosure.

FIG. 1 is a schematic diagram showing an interactive game system 10 according to an embodiment of the present disclosure. The interactive game system 10 comprises motion detectors 11, a computing device 12, an HMD 14 and a cable 15. The user 13 wears the HMD 14 and the HMD 14 is connected to the computing device 12, such as a computer, via the cable 15. The HMD 14 is a display device that a person wears on the head in order to have video information directly displayed in front of the eyes. HMDs are also known as near-to-eye displays. An HMD has either one or two small CRT, LCD or OLED displays with magnifying lenses and other optical elements. The displays and optics are typically embedded in a helmet, glasses, or a visor, which the user can wear. Lenses and other optical components are used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth in the images by simulating the angular difference between the images viewed by each eye when looking at an object, due to the different positions of the eyes. This angular difference is one of the key parameters the human brain uses in processing images to create depth perception or distance in human vision.

The motion detectors 11 detect the motion of user 13 and transmit corresponding motion data to the computing device 12. When the user 13 is approaching one of the motion detectors 11, an alarm signal is transmitted to the HMD 14 to inform the user 13 not to move forward anymore. Because the motion detectors 11 could affect activity space of the user, the number of the motion detectors 11 used in the interactive game system 10 is required to be reduced or the motion detectors 11 are replaced in other alternative embodiments of the present disclosure. Therefore, some embodiments of the present disclosure propose an interactive game system without motion detectors 11.

Figure 2:
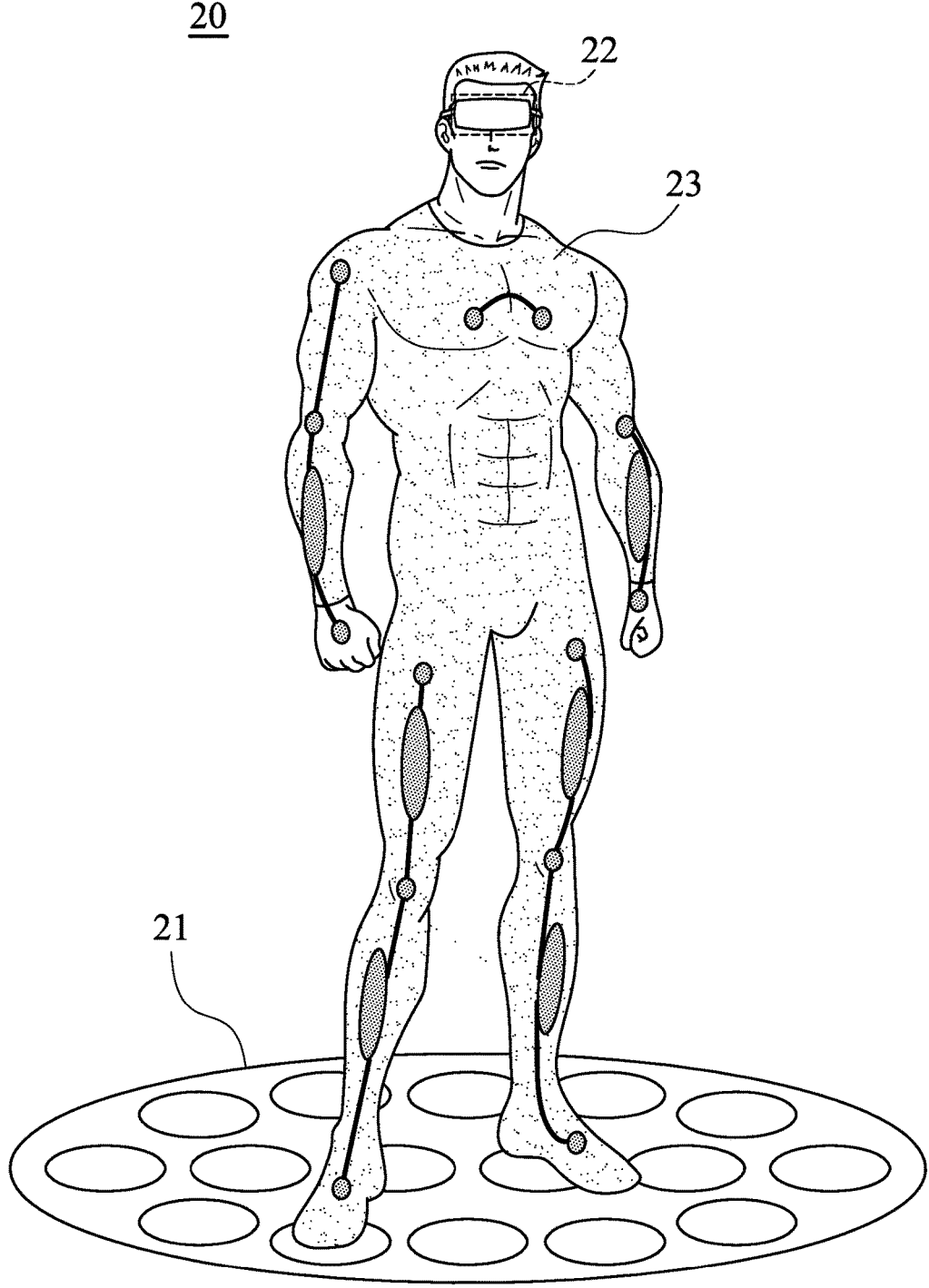
FIG. 2 is a schematic diagram showing an interactive game system 20 according to another embodiment of the present disclosure.

FIG. 2 is a schematic diagram showing an interactive game system 20 according to another embodiment of the present disclosure. The interactive game system 20 of FIG. 2 comprises a ground pad 21, an HMD 22 and a suit 23. The user wears the suit 23 which has a plurality of types of sensors, transceivers, conductive lines, soft and flexible batteries, and a wearable computing device. The suit 23 can be implemented by a jumpsuit (also called a game suit), but the present disclosure is not limited thereto. The novel ground pad 21 with a wireless charging function is also provided for the suit 23 and the ground pad 21 can be implemented by different kind of sensing pads. The ground pad 21 is connected to a power outlet to provide power to wireless power receivers embedded on the foot regions of the suit 23. The wireless power receivers receive power from the ground pad 21 and then charge the soft and flexible batteries for providing power to the wearable computing device and HMD 22 via conductive lines hidden in the suit 23. A detailed description will be provided separately in the following figures according to different parts of the interactive game system 20.

In FIG. 2, a sensor embedded on the foot region of the suit 23 and a wireless charging device are described. The wireless receiver receives power from the transmitters of wireless charging devices arranged in an array of the ground pad 21. In the following description, the sensor embedded on the foot region of the suit 23 is called a wireless sensor, and it is capable of receiving power from the wireless charging device, receiving a data/signal from the wireless charging device, and transmitting a data/signal to the wireless charging device. In another embodiment, the wireless sensor also can be embedded on soles of shoes worn by the user. The wireless charging device embedded on the ground pad 21 is capable of transmitting power to the wireless sensor, sensing signals/data from the wireless sensor, and transmitting data/signals to the wireless sensor, the HMD 22, or a host device. In another embodiment, the wireless charging device is only capable of transmitting power to the wireless sensor and receiving data/signals from the wireless sensor. In this embodiment, the ground pad 21 can be made of a square shape, a rectangle shape or a circular shape and a perimeter of the ground pad 21 is about 3 m~5 m.

Figure 3:
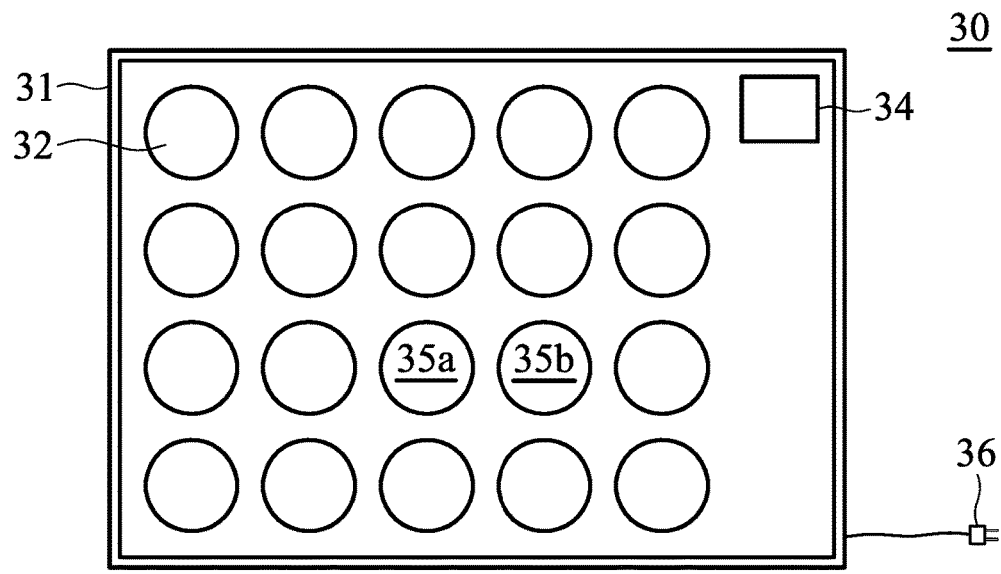
FIG. 3 is a schematic diagram of a proposed ground pad 30 with a wireless charging function and a positioning function.

FIG. 3 is a schematic diagram of a proposed ground pad 30 with a wireless charging function and a positioning function. The ground pad 30 comprises a cable to connect to a power outlet 36, a boundary sensor 31, a plurality of wireless charging devices 32, and a control device 34. The bottom of the ground pad 30 can be implemented by anti-slip material to avoid the ground pad 30 move. The boundary sensor 31 is used inform the user not to leave the ground pad 30. The boundary sensor may 31 be a pressure sensor. Therefore, once the user steps on the boundary sensor 31, crosses the boundary sensor 31, or contacts the boundary sensor 31, an alert signal is generated to inform the user not to leave the ground pad 30. In another embodiment, the boundary sensor 31 is a light transmitter to vertically project a light beam. When a sensor embedded on the suit 23 detects the light beam, an alarm signal is generated to inform the user. In another embodiment, an ultrasound transmitter may be applied to the boundary sensor 31.

In other words, a boundary detection function is integrated with the ground pad 30. The boundary detection function is achieved by the boundary sensor 31 in this embodiment; however, the boundary detection function can be achieved without the boundary sensor 31. For example, the wireless charging devices can be used to implement the boundary detection function. When one of the wireless charging devices arranged in the outer boundary of the ground pad 30 is touched by the user, an alert signal is generated to inform the user not to leave the ground pad 30.

The wireless charging devices 32 are arranged in a matrix, and each of the wireless charging devices 32 has its specific number and corresponding position information. The position information may be coordinate data for indicating the position of a specific wireless charging device 32 in the ground pad 30.

In another embodiment, a pressure sensing layer comprising a plurality of pressure sensing circuits is provided and disposed on the ground pad 30. When one of the outer boundaries of the pressure sensing circuits detects a contact, an alert signal is generated to inform the user not to leave the ground pad 30.

The control device 34 of ground pad 30 can be a hardware-implemented control module to execute the boundary detection function, and to transmit the alert signal to the HMD or another interactive device embedded on the suit 23 and worn by the user.

In another embodiment, the ground pad 30 does not have any control device. The ground pad 30 is connected to a host and controlled by the host. The host will monitor the ground pad 30 to determine whether the user is going to leave the ground pad 30. Once the boundary sensor 31 is contacted, an interrupt signal is then generated to inform the host. In other words, one objective of the boundary detection function is to generate a signal, i.e. an interrupt signal or an alert signal, when a predefined condition is met.

Please refer to FIG. 3, in which another embodiment involves the ground pad 30 further comprising a pressure sensing layer to detect whether the ground pad 30 is touched by the user. In this embodiment, the control device 34 controls all the wireless charging devices 32 and the boundary sensor 31. The control device 34 comprises a transceiver to receive signals from an HMD being worn by the user and/or a host device electrically connected to the HMD. The wireless charging devices 32 may comprise a wireless charging device 35a or a position sensing device 35b. When the user steps on the ground pad 30, for example the wireless charging device 35a or the position sensing device 35b, the control device 34 transmits a position signal corresponding to the wireless charging device 35a or the position sensing device 35b to the host device, and the host device can change the stereoscopic images shown in the HMD according to the user's movement. In another embodiment, when the user steps on the wireless charging device 35a, a sensor embedded on the foot region of the suit 23 senses and transmits a position signal corresponding to the wireless charging device 35a or the position sensing device 35b to the HMD and the HMD transmits the position signal to the host. The position signal may comprise the serial numbers of the wireless charging device 35a and the position sensing device 35b, the position of the wireless charging device 35a or the position sensing device 35b, the signal strength, and the identification of the sensor approaching the wireless charging device 35a or the position sensing device 35b. Concluding the features of the ground pad described above, key features are listed in the following description. The disclosed components listed in the following description are not necessarily for each embodiment of the ground pad. A person skilled in the art can select only those components which are necessary to be integrated in the ground pad.

Figure 4:
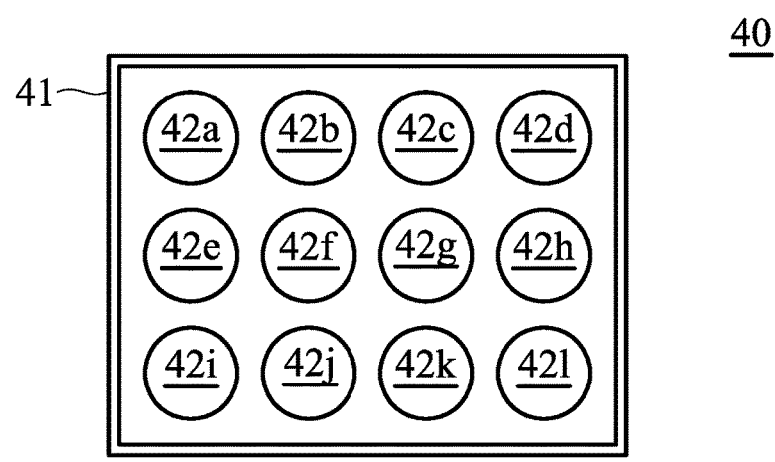
FIG. 4 shows a ground pad 40 with a wireless charging function and a positioning function.

Please refer to FIG. 4. FIG. 4 shows a ground pad 40 with a wireless charging function and a positioning function. In FIG. 4, only 12 wireless charging devices are disclosed, but the amount of wireless charging devices is adjustable based on design requirements. The more wireless charging devices there are, the more precise position information can be provided. The ground pad 40 comprises a boundary sensor 41 and a plurality of wireless charging devices labeled from 42a to 42l. A control device is also embedded in the ground pad 40, but not shown in FIG. 4. When the user touches or steps on the boundary sensor 41, an alarm signal is provided to the user to inform the user that he is leaving the ground pad 40.

The alarm signal may be an acoustic signal played by a speaker embedded in the ground pad 40. In other words, when the boundary sensor 41 detects a contact from the user, the speaker plays the alarm signal with specific tone or frequency. In another embodiment, when the boundary sensor 41 is touched by the user, a detection signal is immediately transmitted to the control device of the ground pad 40, and the control device plays the alarm signal with specific tone or frequency via the speaker. Since the user is wearing an HMD, it may be not easy to hear the alarm signal from the ground pad 40, so another alert mechanism is provided.

When the boundary sensor 41 detects that the user may be moving off the ground pad 40, a detection signal is then transmitted to the control device, the control device transmits a control signal to the HMD the user worn via a wireless module embedded in the control device or electrically connected to the control device. When the HMD receives the control signal, the HMD generates an alarm signal in form of video or acoustic form and plays the alarm signal by the display of the HMD or the speaker of the HMD.

In another embodiment, the boundary sensor 41 projects a boundary signal vertically upward. When a light sensor embedded in the suit 23 detects the boundary signal, the light sensor transmits a sensing signal to the HMD, and a processor of the HMD generates the alarm signal in form of video or acoustic form. In another embodiment, when the processor of the HMD receives the sensing signal, the processor of the HMD transmits the sensing signal or a feedback generated based on the sensing signal to the host via a wired cable or a wireless communication protocol. The host determines whether to inform the user that he has left and determines which type of alarm signal is suitable for informing the user. The host may add a flash effect on images shown in displays of the HMD, or a text may be added on images shown on the display, which is disposed in front of user's eyes.

In another embodiment, the boundary sensor 41 further connected to a wireless module. When the boundary sensor 41 detects a contact, the wireless module transmits an alarm signal to the HMD or the host connected to the HMD. In this embodiment, the boundary sensor 41 comprises a plurality of pressure sensors, and when the user steps on the boundary sensor 41, the pressure sensors are activated, and a detection signal is generated accordingly. In another embodiment, the boundary sensor 41 comprises a plurality of wireless sensing circuits. When the user's foot is approaching the wireless sensing circuit, the sensor embedded on the foot regions of the suit 23 induces a sensing current on the wireless sensing circuit, and the sensing current is detected by a control circuit of the boundary sensor 41. In another embodiment, the sensing current is detected by the control device of the ground pad 40. Since the boundary sensor 41 comprises a plurality of wireless sensing circuits, the control circuit or the control device of the ground pad 40 can know where the user may be moving off the ground pad 40.

In another embodiment, the boundary sensor 41 comprises 4 line segments to form a closed area. The wireless sensing circuits in each line segment are connected to the same I/O pin of a control chip, and when a current is induced in the wireless sensing circuit, the logic level of the I/O pin is changed and an interrupt signal is generated accordingly. When the control chip receives the interrupt signal, the control chip generates an alarm signal to inform the user not to leave the ground pad 40 or the control chip transmits a signal to the HMD or the host to inform the user that he is going to leave the ground pad 40.

With reference to FIG. 4, the positioning function of the ground pad 40 is described in the following paragraphs. The wireless charging devices 42a to 42l have identification data and position data. The position data may be coordinate data. For example, the position data of the wireless charging device 42a is (1, 1), the position data of the wireless charging device 42b is (1, 2), and the position data of the wireless charging device 42l is (3, 4). When a wireless charging device is touched or contacted, the wireless charging device transmits the position data and its identification data to the control device of the ground pad 40. Then, the control device transmits the received position data and identification data to the HMD or the host. When the host receives the position data, the host can change images shown in display of the HMD according to the user's movement, which is determined based on the position data at continuous time points.

In another embodiment, each of the wireless charging devices 42a to 42l comprises an RFID storing identification data and position data. When a sensor embedded on the a foot region of the suit 23 senses the RFID, the identification data and position data is transmitted to the processor of the HMD via the sensor. The HMD transmits the received position data to the host and the host changes the images shown on the displays of HMD accordingly. In another embodiment, each of the wireless charging devices 42a to 42l comprises a BT (Bluetooth), a Wi-Fi module or other related modules that uses MAC (Media Access Control) addresses as identification. The BT module or the Wi-Fi module further stores position data corresponding to the wireless charging device. When the user steps on the wireless charging device, the BT module or the Wi-Fi module transmits the identification data and position data to the HMD or to the host directly or via the HMD. Then, the host changes the images shown on the displays of HMD accordingly.

In the embodiment, the wireless charging device provides its position data to the HMD or the host; however, the position data can be ignored. The wireless charging device provides only its identification. Before the user wearing the suit 23 steps on the ground pad 40, the host connected to the HMD first receives a plane of the ground pad 40. The plane comprises the identification data of the wireless charging devices 42a to 42l and corresponding position data or coordinate data of the wireless charging devices 42a to 42l. Thus, the wireless charging devices 42a to 42l provide only their own identification data to the host directly or indirectly, and the host determines the user's position based on the received identification data and the plane. To achieve this, the ground pad 40 is wirelessly/connected by wire to the host. When the ground pad 40 is connected to the host, the host acquires the plane from a storage device embedded in the ground pad 40. In another embodiment, no control device is embedded in the ground pad 40. When the host connects to the ground pad 40, the host acquires the plan and then takes control of the ground pad 40. Every contact on the ground pad 40, and every sensing signal sensed by the ground pad 40 will be transmitted to the host, and the host determines corresponding actions based on the received signals or data.

Figure 5:
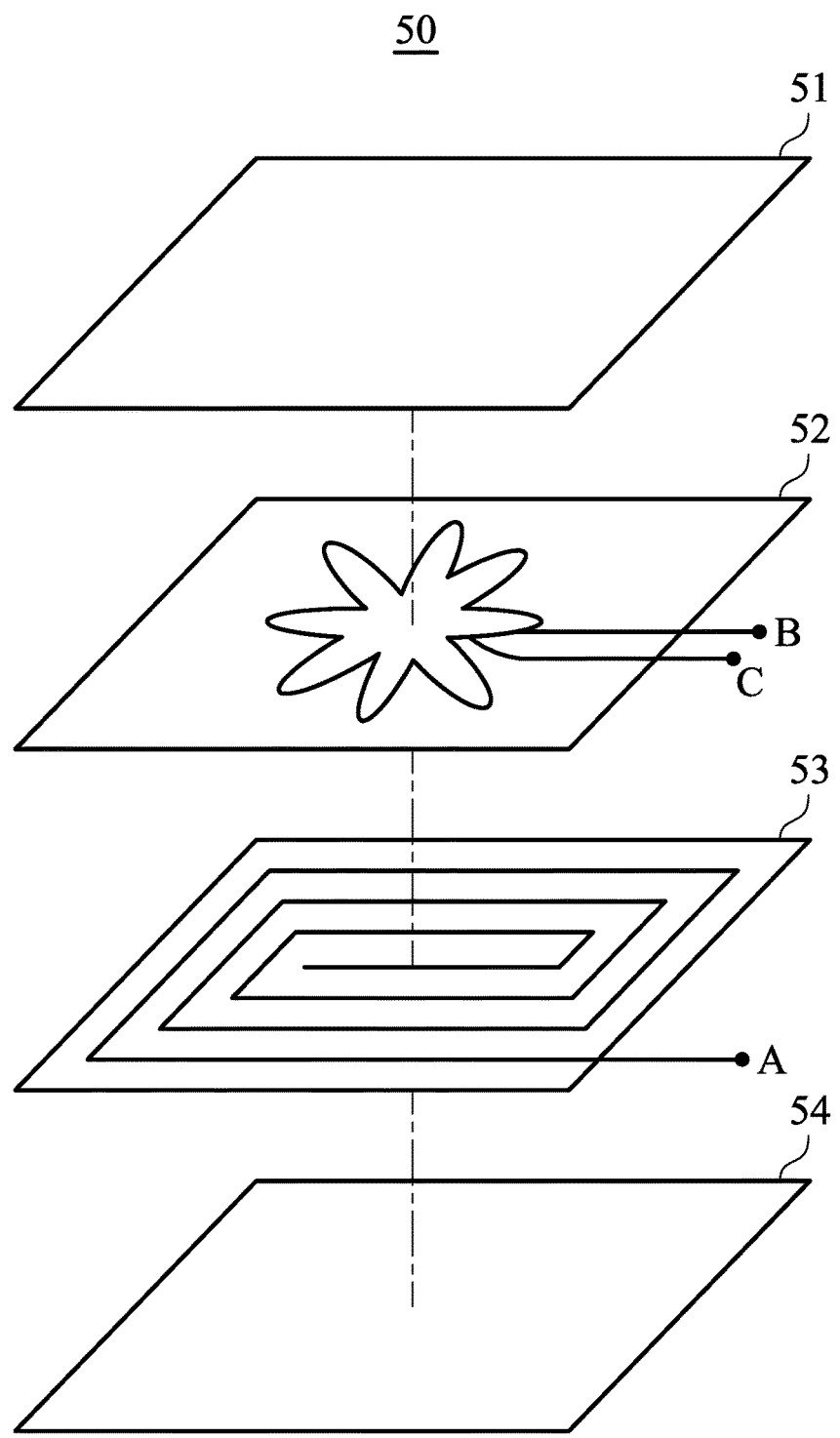
FIG. 5 shows a schematic diagram of a wireless charging device 50 according to an embodiment of the present disclosure.

FIG. 5 shows a schematic diagram of a wireless charging device 50 according to an embodiment of the present disclosure. Only one wireless charging device 50 is provided in FIG. 5, however, the structure of the whole ground pad, such as the ground pad 40, is similar to the structure shown in FIG. 5. The wireless charging device 50 comprises a cover layer 51 for protection, a pressure layer 52, a sensing circuit layer 53 and a base layer 54. The cover layer 51 and the base layer 54 may be made of plastic material and are flexible. In another embodiment, the cover layer 51 comprises a hard cover embedded on a flexible material layer.

The pressure layer 52 comprises at least one radial sensing electrode, and a control circuit, a detecting circuit or a control chip detects whether the resistance between nodes B and C is changed. If the resistance between nodes B and C is changed, it means something is on the wireless charging device 50, thus, a touch or a contact on the wireless charging device 50 is detected. The radial sensing electrode is made of a special conductive line to form a radial shape. When something is on the wireless charging device 50, a length deformation of the sensing electrode is generated and the resistance of the sensing electrode is changed. In another embodiment, the amount the resistance between nodes B and C changes can help us to know the weight of the user, and it can be one characteristic for identifying a particular user. Thus the pressure layer 52 can distinguish different pressure put by the users. The different pressure can be applied in gaming purposes such as surreptitiously, normal steps, etc.

The sensing circuit layer 53 comprises a coil in the form of a circular shape. Rubber material (up to 10 mm) is used to wrap the coil to protect the wireless charging device 50. The sensing circuit layer 53 can provide power to a power receiver embedded on the foot of the game suit worn by the user. In another embodiment, an identification circuit is connected to the sensing circuit layer 53. The identification circuit stores information of the wireless charging device 50, such as position data and a serial number of the wireless charging device 50. The identification circuit may be implemented by an RFID and the designer can store any data in the storage medium of the identification circuit. In another embodiment, the identification circuit can be replaced or integrated within a BT module, a Wi-Fi module or other related modules. The BT module or the Wi-Fi module transmits the information of the wireless charging device 50 stored in the identification circuit to an HMD or a host device. In another embodiment, the BT module or the Wi-Fi module that uses mac address as identification data and transmits the identification data to the HMD or the host device. In another embodiment, information of each wireless charging device 50 is stored in the BT module or the Wi-Fi module embedded in the wireless charging device 50.

When the sensing circuit layer 53 detects that the wireless sensor is approaching, data stored in the identification circuit is transmitted to the wireless sensor, and the wireless sensor or a wireless communication module embedded on the suit 23 will transmit a signal indicating whether the battery embedded on the suit 23 needs to be charged (i.e., reporting the battery status), wherein the wireless transmission module can be a BT module or a Wi-Fi module. If the battery needs to be charged, the sensing circuit layer 53 charges the battery via the wireless sensor. In one embodiment, when the batter needs to be charged, a feedback signal is transmitted to a control chip, and the control chip determines the magnitude of current passing through the coil. In a default condition, no current is flowing through the coil embedded in the sensing circuit layer 53, and when the wireless sensor is approaching the wireless charging device 50, an induced current is generated on the coil and the voltage level of node A is changed, and an interrupt signal is generated accordingly. In a practical embodiment, the coil of the sensing circuit layer 53 and a coil of the power receiver (i.e. the wireless sensor) are required to be similar size, diameters of the coils can be from 1 cm to more than 1 meter, and charging range is from 5 mm~200 mm depending on the coil size for both receiver and transmitter. The coils having bigger diameter have larger charging range and thus have better power transmission efficiency. The actual operating range (i.e. charging range) for a given application is determined by many factors, including power source and capture device sizes, desired efficiency, and the amount of power to be transferred.

In another embodiment, the pressure layer 52 can be optional, and the sensing circuit layer 53 can detect whether contact occurs. In one embodiment, before the sensor is in physical contact with the cover layer 51, the sensing circuit layer 53 detects the approach of the sensor embedded on the foot regions of the suit 23. In another embodiment, each coil is coupled to a transmitter for transmitting data to the sensor approaching the wireless charging device 50.

In another embodiment, since the sensing coil may be easily influenced by any metal or signal, an isolation layer disposed between the sensing circuit layer 53 and the pressure layer 52 may be an option to reduce such interference. In another embodiment, the sensing circuit layer 53 is disposed above the pressure layer 52.

In another embodiment, the pressure layer 52 is replaced by multiple light sensors such as IR sensors and thus the wireless charging device 50 comprises the cover layer 51, the IR sensors, the sensing circuit layer 53 and the base layer 54. Compared with the identification circuit connected to the sensing circuit layer 53, the IR sensors can be implemented in the wireless charging device 50 with higher density than the identification circuit. Accordingly, the IR sensors applied in the wireless charging device 50 can provide higher sensitivity precision. Thus the IR sensors help the ground pad detecting balancing and directions of the user.

Figure 6:
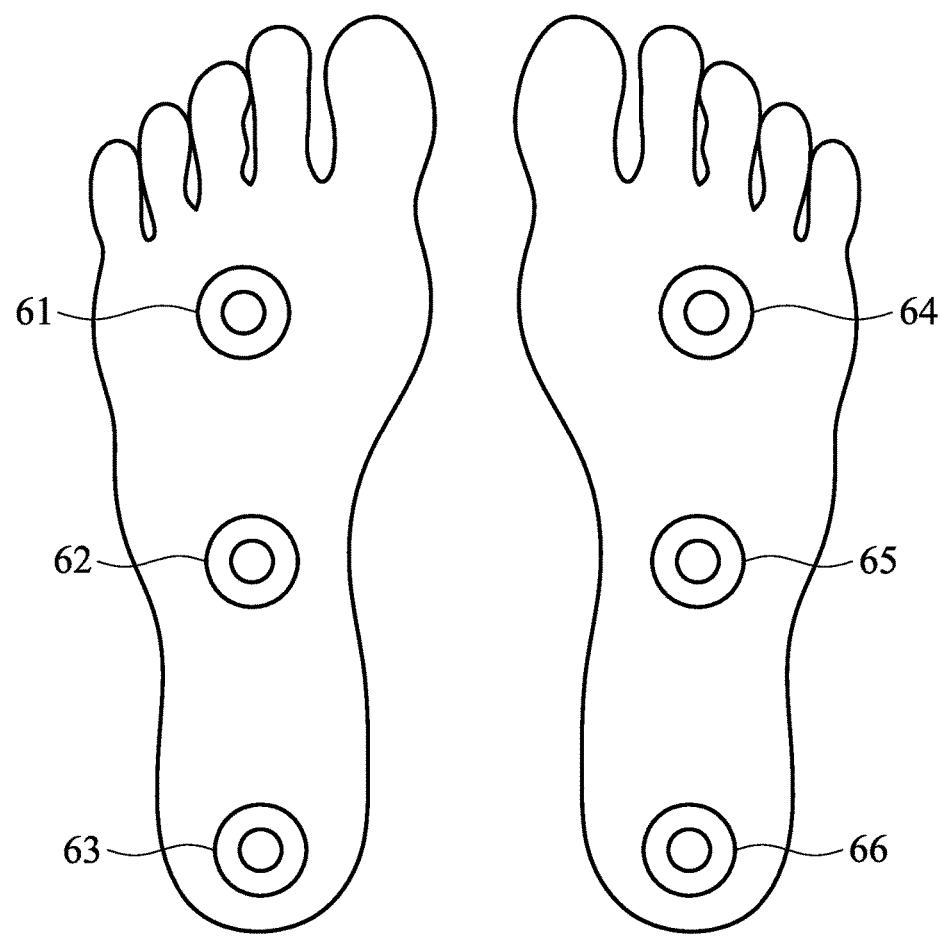
FIG. 6 is a schematic diagram of wireless sensors 61-66 embedded on the foot regions of the suit 23 according to an embodiment of the present disclosure.

Please refer to FIG. 6, which is a schematic diagram of wireless sensors 61-66 embedded on the foot regions of the suit 23 according to an embodiment of the present disclosure. In FIG. 6, a left foot region of the suit 23 comprises a first wireless sensor 61 disposed on the toes side of the left foot, a second wireless sensor 62 disposed on the middle of the left foot, and a third wireless sensor 63 disposed on the heel of the left foot. A right foot region of suit 23 also comprises a fourth wireless sensor 64 disposed on the toes side of the right foot, a fifth wireless sensor 65 disposed on the middle of the right foot, and a sixth wireless sensor 66 disposed on the heel of the right foot. The wireless sensors 61-66 are connected by wire to a battery for power transmission. The wireless sensors 61-66 receive power from the ground pad 21 by a wireless charging mechanism, and the received power is directed to charge the battery embedded on the suit 23. Furthermore, the wireless sensors 61-66 transmit data to the control device embedded on the suit 23 via conductive wires.

When the wireless sensor transmits sensed data or signal to a control device, an identification data and a timestamp is added to the data/signal being transmitted. In another embodiment, each of the wireless sensors 61-66 is connected to the I/O pins of the control device via an independent conductive line. Therefore, the control device can know which wireless sensor is transmitting the data/signal according to the I/O ports. Furthermore, when the user steps on the ground pad 21, the wireless sensors 61-66 also transmit the sensed identification data of contacted wireless charging devices of the ground pad 21. By using the six wireless sensors, the user's movement or direction can be detected. Please refer to FIG. 7.

Figure 7:
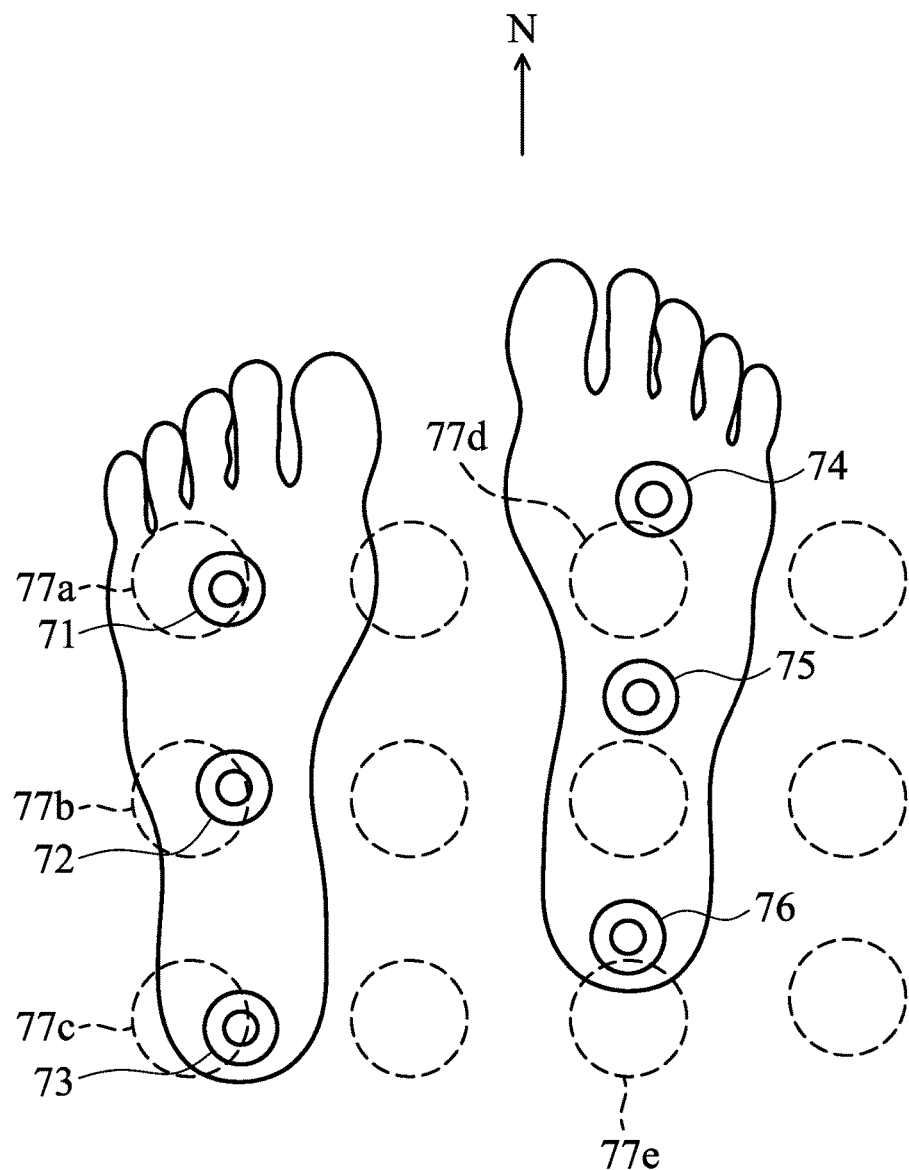
FIG. 7 is a schematic diagram showing the interaction between the wireless sensors 71-76 and the wireless charging devices 77a~77e according to an embodiment of the present disclosure.

FIG. 7 is a schematic diagram showing the interaction between the wireless sensors 71-76 and the wireless charging devices 77a~77e according to an embodiment of the present disclosure. The left foot region of the suit 23 comprises a first wireless sensor 71 disposed on the toes side of the left foot, a second wireless sensor 72 disposed on the middle of the left foot, and a third wireless sensor 73 disposed on the heel of the left foot. The right foot region of the suit 23 comprises a fourth wireless sensor 74 disposed on the toes side of the right foot, a fifth wireless sensor 75 disposed on the middle of the right foot, and a sixth wireless sensor 76 disposed on the heel of the right foot. In FIG. 7, the first wireless sensor 71 and the wireless charging device 77a are overlapped, the second wireless sensor and the wireless charging device 77b are overlapped, the third wireless sensor and the wireless charging device 77c are overlapped, the fourth wireless sensor 74 and the wireless charging device 77d are overlapped and the sixth wireless sensor 76 and the wireless charging device 77e are overlapped.

When a control device, which may be an HMD control device or a host connected to the HMD, receives the sensing signal from the first wireless sensor 71, information of the wireless charging device 77a is also received. The control device further receives information of the wireless charging devices 77b and 77c via the second wireless sensor 72 and the third wireless sensor 73. According to the information of wireless charging devices 77a~77c, the control device can know that the left foot of the user is pointing North. Similarly, the control device can know that the right foot of the user is also pointing North. According to the directions of the left foot and the right foot, the control device determines that the user is facing North. In this embodiment, the control device is the HMD control device embedded on the back of the suit 23. However, the direction of the user can be determined by another control device of the ground pad 21.

A ground pad control device can use the sensed data/signal from the wireless charging devices 77a~77b to determine the direction of the user's body. When the wireless charging device 77a detects the first wireless sensor 71, a detection signal is transmitted to the ground pad control device. The detection signal comprises information of the first wireless sensor 71 and the wireless charging device 77a, and the strength of a sensing signal generated by the first wireless sensor 71 and the first wireless charging device 77a. In another embodiment, the detection signal further comprises an overlap percentage between the first wireless sensor 71 and the first wireless charging device 77a. Similarly, the wireless charging devices 77b~77e transmit the detection signal to the ground pad control device. The ground pad control device receives detection signals from the wireless charging devices 77a~77e to estimate the user's location on the ground pad 21 and the direction in which the user's body is facing. Before the ground pad control device estimates the direction in which the user's body is facing, the ground pad control device first receives relative position information of the wireless sensors 71~76 to know the locations of the wireless sensors. The relative position information may be transmitted by a host when the ground pad 21 is activated via a wired or a wireless transmission medium. In another embodiment, a BT device is embedded in the ground pad to receive the relative position information from another BT device embedded in the HMD 22 or the HMD control device.

In the following paragraphs, several charging mechanisms of the present disclosure are listed as follows: 1. charging by the ground pad; 2. charging by the power transmitter but not the ground pad; 3. charging by a power cable connected to the host device. The HMD control device will estimate battery capacity before charging. In another embodiment, the HMD control device further determines whether the battery needs to be charged according to the battery capacity. When the HMD control device determines that the battery needs to be charged, a charging signal is generated and transmitted to the ground pad, the host device or another power transmitter embedded in a motion sensor or other devices. When the control chip of the ground pad receives the charging signal, the control chip determines which wireless charging device will be activated to transmit power to the power receiver embedded in the suit 23.

Please refer to FIG. 7. Assuming that the battery needs to be charged, the wireless sensors 71-76 transmit the charging signal. When the wireless charging device 77a receives the charging signal, the wireless charging device 77a determines whether to charge the battery via the wireless sensor 71 and a conductive line coupled between the wireless sensor 71 and the battery. Three charging mechanisms for charging by the ground pad are provided.

In the first charging mechanism for charging by the ground pad, the wireless charging device 77a has a control circuit, and the control circuit determines whether to charge the battery based on signal strength between the wireless charging device 77a and the first wireless sensor 71. In another embodiment of the first charging mechanism, the control circuit estimates an overlap area between the wireless charging device 77a and the first wireless sensor 71, and only when the overlay area is greater than a predetermined value can the control circuit of the wireless charging device 77a control the wireless charging device 77a to charge the battery. In another embodiment of the first charging mechanism, the control circuit of the wireless charging device 77a estimates an overlap ratio between the wireless charging device 77a and the first wireless sensor 71, and only when the overlay ratio is greater than a predetermined value can the control circuit control the wireless charging device to charge the battery. The overlap area or ratio can be determined based on the strength of a sensing signal from the wireless sensor or a detection result from pressure sensors or IR sensors of the wireless charging device.

In the second charging mechanism for charging by the ground pad, the wireless charging devices 77a-77e are control by a control chip of the ground pad. The control chip only activates the wireless charging devices that the user steps on to charge the battery. In another embodiment of the second charging mechanism, when the control chip receives the charging signal, the control chip activates all the wireless charging devices embedded on the ground pad to transmit power. In another embodiment of the second charging mechanism, the control chip does not activate all the wireless charging device the user steps on. The control chip activates only the wireless charging device whose overlap area between the wireless charging device and the wireless sensor/power receiver is greater than a predetermined value. In another embodiment of the second charging mechanism, the control chip activates only the wireless charging device whose overlap ratio between the wireless charging device and the wireless sensor/power receiver is greater than a predetermined value. The overlap area or ratio can be determined based on the strength of the sensing signal from the wireless sensor or a detection result from pressure sensors. For example, the overlap area between the wireless charging device 77d and the wireless sensor 74 is less than a threshold value, the wireless charging device 77d is not activated to provide power to the wireless sensor 74. Similarly, the wireless charging device 77e is not activated to provide power to the wireless sensor 76. The overlap area between the wireless charging device 77a and the wireless sensor 71 is greater than a threshold value, the wireless charging device 77a is activated to provide power to the wireless sensor 71. Similarly, when the overlap area between the wireless charging device 77b and the wireless sensor 72 is greater than a threshold value, the wireless charging device 77b is activated to provide power to the wireless sensor 72.

In the third charging mechanism for charging by the ground pad, the ground pad does not have a control device and the ground pad is controlled by the host device or a control device of the HMD (also referred to as a control device in this paragraph). When the control device receives the charging signal, the control device may activate all the wireless charging devices embedded on the ground pad to transmit power. In another embodiment of the third charging mechanism, the control device does not activate all the wireless charging devices the user steps on. The control device activates only the wireless charging devices whose overlap area between the wireless charging device and the wireless sensor/power receiver is greater than a predetermined value. In another embodiment of the third charging mechanism, the control device activates only the wireless charging devices whose overlap ratio between the wireless charging device and the wireless sensor/power receiver is greater than a predetermined value. The overlap area or ratio can be determined based on the strength of a sensing signal from the wireless sensor or a detection result from pressure sensors.

The charging mechanisms are described above. Furthermore, the charging current or charging voltage is adjustable according to parameters of the battery or/and an operation mode of the HMD. For example, if the HMD operates in game mode, i.e., the power consumption is great, and thus the ground pad charges the battery with a maximum current or voltage. If the HMD operates in standby mode, or the power consumption of the VR program is less, a smaller current or voltage is applied to charge the battery. In another embodiment, when the capacity of the battery is less than a first predetermined value, a first charging current/voltage is applied to charge the battery. When the capacity of the battery is less than a second predetermined value, a second charging current/voltage is applied to charge the battery, wherein the second predetermined value is less than the first predetermined value, and the second charging current/voltage is greater than the first charging current/voltage. It should be noted that the charging current/voltage is limited by a sensing coil in the wireless charging device or the wireless sensor (power receiver) embedded on the suit 23.

Figure 8:
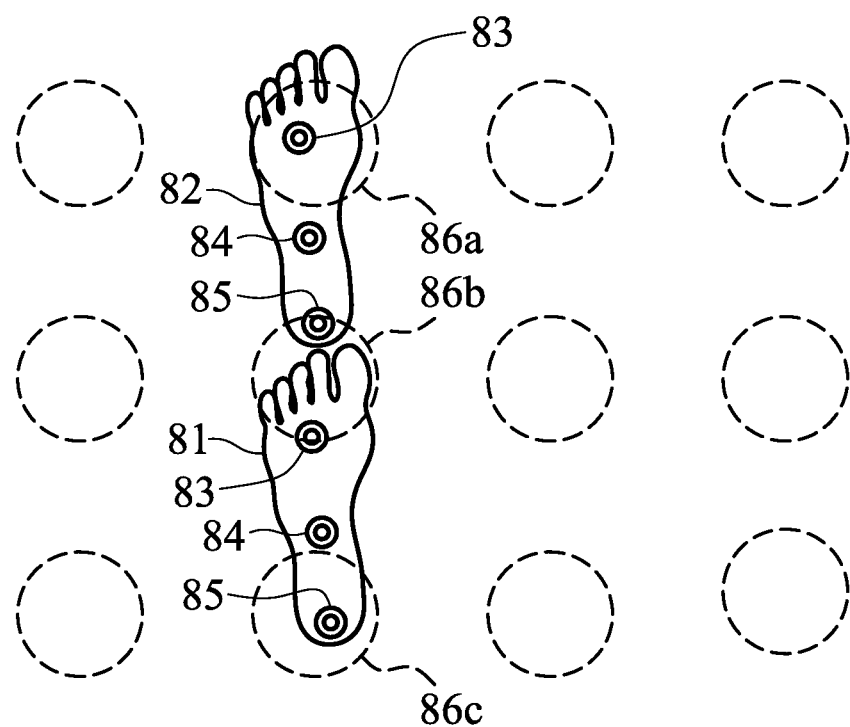
FIG. 8 is a schematic that shows how to detect a user's movement based on interaction between the ground pad 21 and the sensors embedded on the foot regions of the suit 23 according to an embodiment of the present disclosure.

FIG. 8 is a schematic that shows how to detect a user's movement based on interaction between the ground pad 21 and the sensors embedded on the foot regions of the suit 23 according to an embodiment of the present disclosure. In FIG. 8, the ground pad 21 and the suit 23 can also provide information related to the user's movement to the HMD control device or the host connected to the HMD 22. The first footprint 81 is generated at time T1 and the second footprint 82 is generated at time T2, after time T1. The foot region of the suit 23 comprises wireless sensors 83-85. At time T1, the wireless sensor 83 contacts the wireless charging device 86*b* and the wireless sensor 85 contacts the wireless charging device 86*c*. At time T2, the wireless sensor 83 contacts the wireless charging device 86*a* and the wireless sensor 85 contacts the wireless charging device 86*b*. According to the information of the wireless charging devices 86*a*-86*c* at times T1 and T2, the user's movement is northward.

The user's movement can be determined by a control device of the HMD 22 or the ground pad 21. From the perspective view of the control device of the ground pad, the wireless charging device 86*b* senses the wireless sensor 83 at time T1, then, the wireless charging device 86*a* senses the wireless sensor 83 at time T2 after time T1. The control device of the ground pad 21 then determines that the user is moving northward. From the perspective view of the control device of the HMD 22, the wireless sensor 83 senses the wireless charging device 86*b* at time T1, and the wireless sensor 83 senses the wireless charging device 86*a* at time T 1. If the control device of the HMD 22 has information of relative positions of the wireless charging device 86*a* and the wireless charging device 86*b*, the control device of the HMD 22 can know the that the user is moving northward.

Although the position and direction information are determined by the control device of the HMD 22 or the ground pad 21, the present disclosure is not limited thereto. The sensing signals from the wireless charging devices or wireless sensors can be transmitted to a host device, which is executing a VR program according to interactions between the suit 23 and the ground pad. The host device then determines the user's position, direction, or movement according to the sensing signal. The determination method is similar to the determination mechanism above. In another embodiment, the control device of the HMD 22 or the ground pad 21 transmits the determined position, direction, or movement to the host device, and the host device determines the corresponding actions of the user in the VR game.

Figure 9:
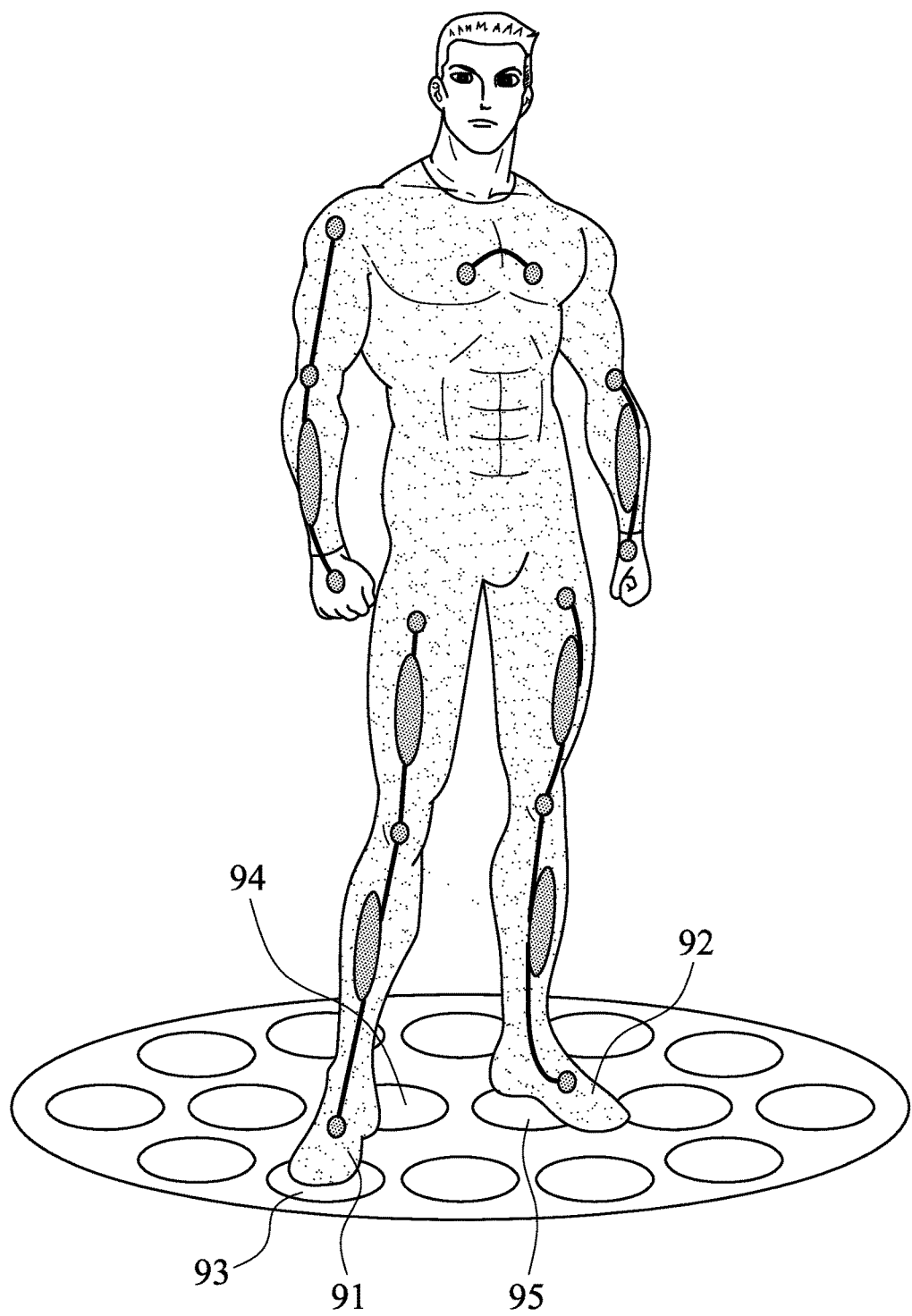
FIG. 9 is a schematic that shows interaction between the wireless sensors 91, 92 embedded on the foot regions of the game suit and the wireless charging devices 93-95 according to an embodiment of the present disclosure.

Please refer to FIG. 9, which is a schematic that shows the interaction between the wireless sensors 91, 92 embedded on the foot regions of the game suit and the wireless charging devices 93-95 according to an embodiment of the present disclosure. In FIG. 9, the wireless sensor 91 embedded on the right foot region of the suit 23 is on the wireless charging devices 93 and 94, and the wireless sensor 92 embedded on the left foot region of the suit 23 is on the wireless charging device 95. According to the locations of the wireless charging devices 93, 94 and 95, which sense the wireless sensors 91 and 92, the user's position and direction can be determined, and the host device determines that the user's right foot is ahead to the left foot. The host device therefore can create a virtual character mirroring the user's actual status in the VR program. In one embodiment, the wireless sensors 91 and 92 are connected by wire to the control device embedded on the suit 23. The control device receives detection result from the wireless sensors 91 and 92 and transmits the detection result to the host device.

Figure 10:
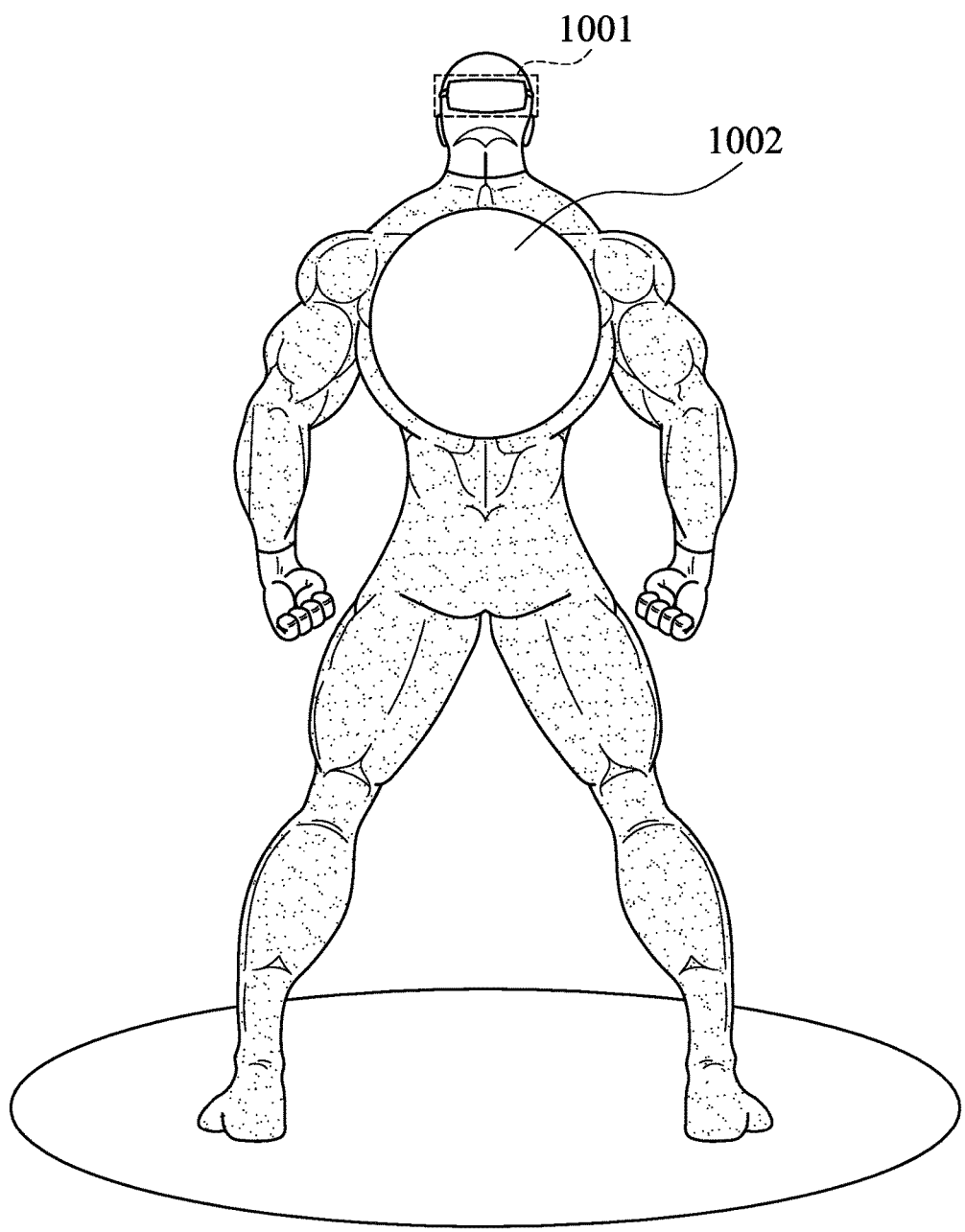
FIG. 10 is a schematic diagram showing an HMD 1001 and a control device 1002 of the HMD 1001 according to an embodiment of the present disclosure.

FIG. 10 is a schematic diagram showing an HMD 1001 and a control device 1002 of the HMD 1001 according to an embodiment of the present disclosure. The HMD 1001 is connected by wire to the control device 1002 via a flexible cable. In another embodiment, the control device 1002 can be replaced by a portable device, and the HMD 1001 comprises a socket for the portable device inserted therein.

The control device 1002 comprises a processor, a storage medium, a random access memory, and a flexible battery that can be charged by the ground pad or another wireless power transmitter disposed on another device, such as a motion detector. In another embodiment, more than one flexible battery is embedded in the suit 23 and the flexible batteries are connected in parallel or series. In another embodiment, a power management device embedded in the control device 1002 controls the serial/parallel connections between the flexible batteries to adjust the magnitude of the current or voltage applied to the HMD 1001.

Figure 11:
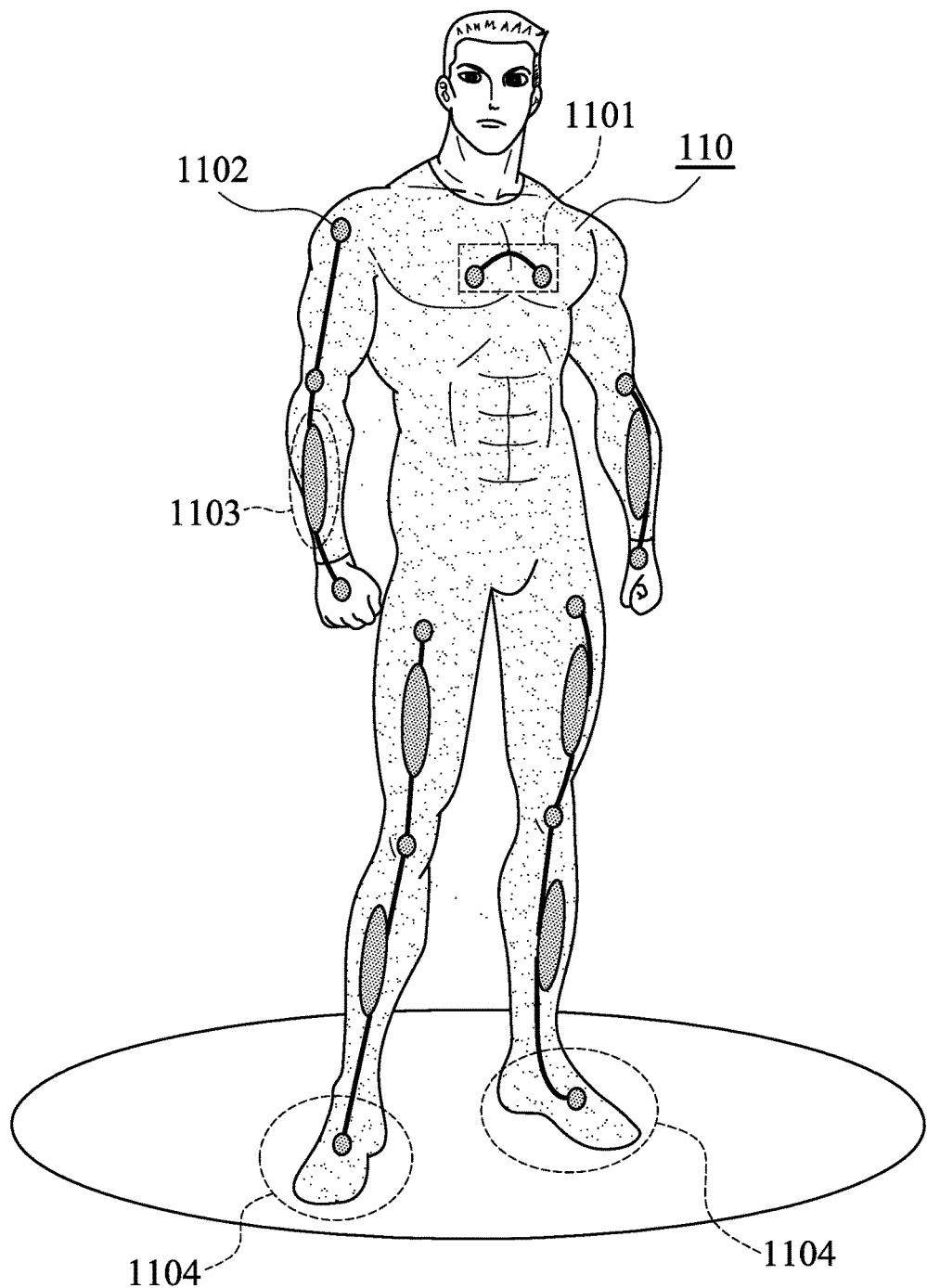
FIG. 11 is a schematic diagram showing a user wearing a game suit 110 according to an embodiment of the present disclosure.

FIG. 11 is a schematic diagram showing a user wearing a game suit 110 according to an embodiment of the present disclosure. The game suit 110 comprises an ECG (Electrocardiography) sensor 1101, a plurality of infrared (IR) track points 1102, a force feedback device 1103 and power receivers 1104. The ECG sensor 1101 embedded on the game suit 110 detects the electrical activity of the heart over a period of time using electrodes placed on the user's body. The ECG sensor 1101 detects the tiny electrical changes on the skin that arise from the heart muscle depolarizing during each heartbeat. In another embodiment, the ECG sensor 1101 does not come into direct contact with the user's body, i.e., the ECG sensor 1101 can measure the pulse of a chest muscle without contacting the user's skin. The measured ECG signal is transmitted to a host device to project the user's current status to the corresponding VR character in the VR program. For example, if the ECG sensor 1101 detects that the heartbeat of the user is faster than usual, the host device or the VR program determines that the user may be tired and breathless, and the host device or the VR program may then cause the VR character to act like the user. For example, the host device or the VR program uses the heartbeat of the user detect the user's stress level and emotion level for game or application interaction. Then the host device or the VR program dynamically adjusts each of the game levels such as "Easy" "Medium" and "Hard" according to the user's stress level and emotion level. This function allows the host device or the VR program dynamically change the game contents to reach the users' requirements. In another embodiment, the ECG sensor 1101 is not embedded on the game suit 110, but embedded on the HMD. In another embodiment, ECG waveform of the measured ECG signal is used as a personalized ID used for logging into the user's VR program.

The IR track points 1102 of the game suit 110 are disposed in several positions of the game suit 110, especially at the joints of the body. The motion detectors detects the tracks of the IR track points 1102 to simulate the user's movement or action and cause the corresponding VR character to perform the same movement or action.

The force feedback device 1103 acts according to a VR character played by the user in a VR program. The force feedback device 1103 of the game suit 110 is illustrated with an embedded vibrator and an embedded airbag. When the VR character is attacked by another VR character, the vibrator vibrates to simulate the feeling that the VR character feels in the user's body. The vibrator can also serve as a messenger. When the VR character receives messages from the real world or the VR world, the vibrator vibrates to inform the user. In another embodiment, when the VR character touches or contacts a VR wall, the vibrator vibrates to inform of the user holding still. In another embodiment, when the user is going to leave the ground pad, the vibrator vibrates to inform of the user holding still. In another embodiment, the vibrator comprises a receiver to receive signals from a boundary sensor of the ground pad, and when the vibrator receives the signal from the boundary senor, the vibrator vibrates to inform of the user moving back to the ground pad. The embedded airbag comprises an inflator to inject air into the airbag. The embedded airbag simulates situations when the corresponding VR character is pushed or pressed in the VR program. In another embodiment, the embedded airbag acts based on the ECG signals. For example, when the control device of the HMD determines that the user had stood for a long time, the airbag on the leg is injected by air to push blood back to the heart.

The power receivers 1104 of the game suit 110 receive wireless power from the ground pad in FIG. 11. In another embodiment, the power receivers 1104 are disposed on the whole game suit 110. In the paragraphs above, the function of the power receivers 1104 may be integrated in wireless sensor or receiver. The power receiver 1104 is made of a coil in which a current is induced when receiving wireless power. Although the components of the game suit 110 are described above, other sensors such as a G sensor or a barometer may be used on the game suit 110.

In another embodiment, the game suit 110 further comprises a G sensor. The G sensor measures acceleration speed, and the measured acceleration speed is transmitted to the host executing the VR program. The VR program simulates the user's action on the VR character. In another embodiment, the acceleration speed can be transformed into another data used in the VR program. For example, the G sensor is embedded on the arm of the user, and when the user swings his hand, acceleration speed is measured, and is transformed into an attack power of the VR character.

In another embodiment, the game suit 110 further comprises a barometer. The barometer is used to estimate altitude. The barometer may be embedded on the ankle position of the game suit 110. When the user jumps, the barometer detects changes and estimates a corresponding altitude. The estimated altitude is transmitted to the host device and the corresponding VR character will perform the same jump.

Figure 12:
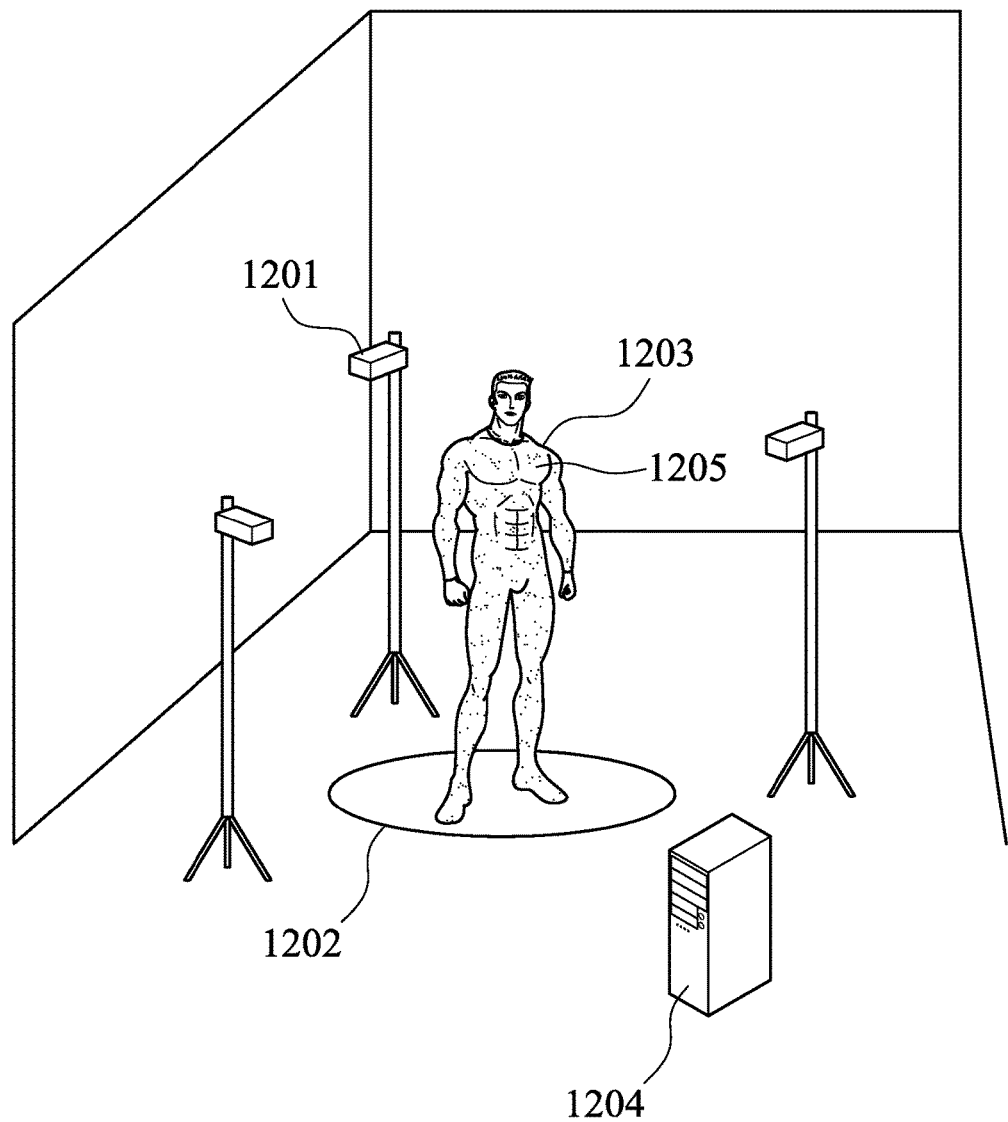
FIG. 12 is a schematic diagram showing an interactive game system 120 for implementing a VR experience according to an embodiment of the present disclosure.

FIG. 12 is a schematic diagram showing an interactive game system 120 for implementing a VR experience according to an embodiment of the present disclosure. The interactive game system 120 comprises at least one motion detector 1201, a ground pad 1202, a host device 1204, an HMD and a game suit 1205. The user 1203 steps on the ground pad 1202 and the motion detector 1201 detects the user's motion. The host device 1204 executes a VR program based on data/signals from the motion detectors 1201, the ground pad 1202, and the HMD and the game suit 1205 worn by the user 1203. In this embodiment, the motion detector 1201 has a wireless charging function to provide power to the power receivers embedded on the game suit 1205. The power transmitter embedded on the motion detector 1201 may be controlled by the control device of the HMD or the host device 1204. In another embodiment, the motion detector 1201 comprises a wireless module to receive or transmit signals.

In another embodiment of FIG. 12, the game suit 1205 further comprises at least one calibration point embedded on the waist of the game suit 1205. When sensors embedded on the hand of the game suit 1205 touch or approach the calibration point, the interactive game system 120 will re-capture the user's posture or calibrate sensors embedded on the game suit 1205. For example, when the user 1203 feels that the corresponding virtual character in the VR game cannot correctly reflect what he did, the user 1203 points to the calibration to calibrate inconsistencies between the posture of user 1203 and the posture of the virtual character.

Figure 13A:
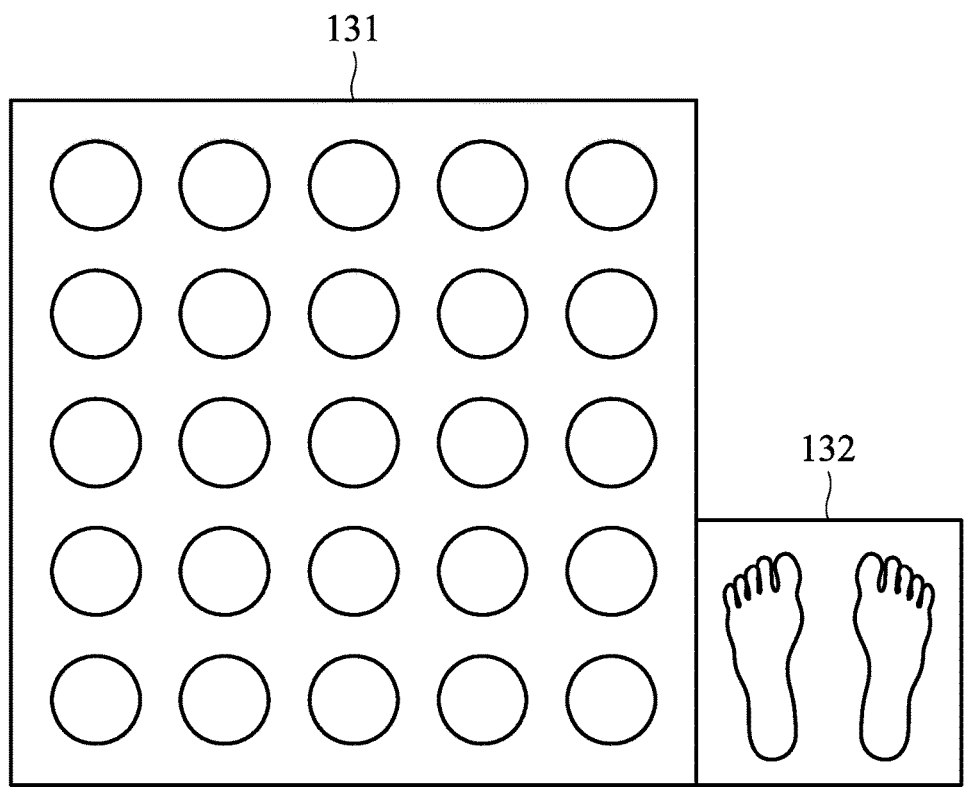
FIG. 13A shows a top view of a ground pad 130 according to an embodiment of the present disclosure.

FIG. 13A shows a top view of a ground pad 130 according to an embodiment of the present disclosure. The ground pad 130 comprises a sensing pad 131 and a login pad 132. Functions and components of the sensing pad 131 can be the ground pads shown in FIGS. 2-8. In FIG. 13A, the login pad 132 is connected to the sensing pad 131 and is used for identifying the user. When the user steps on the login pad 132, NIR sensors of the login pad 132 captures foot vein images of the user. Then the foot vein images are transmitted to a control device of sensing pad 131, the control device of the HMD or the host device. The foot vein images of the user are useful for distinguishing from other users such as the user's family members. Therefore the foot vein images of the user can be a personalized ID used for logging into the user's VR program. In a practical embodiment of the ground pad 130, the side length of the sensing pad 131 is about 3 m~5 m, and the side length of the login pad 132 is about 30 cm~40 cm, a diameter of the NIR sensor is 3 mm, sensing area of the NIR sensor is 40×40 mm$^2$, and number of the NIR sensors are 100 arranged in a 10×10 matrix. But the present disclosure is not limited thereto. In another embodiment, the login pad 132 can be integrated into the sensing pad 131. In another embodiment, the sensing pad 131 and the login pad 132 are disposed separately. In another embodiment, the login pad 132 can be a circular shape or a rectangular shape.

In another embodiment, the login pad 132 is made of pressure sensors instead. In this embodiment, the login pad 132 comprises 2,304 pressure sensors arranged in a 48×48 matrix, spatial resolution of the login pad 132 is about 8 mm, sensing area of the login pad 132 is 38 cm×38 cm, pressure range of the login pad 132 is 0.72 P~30 PSI, but the present disclosure is not limited thereto. The pressure sensors of the login pad 132 can distinguish different pressure put by the users and thus can be applied in logging into the user's VR program.

Figure 13B:
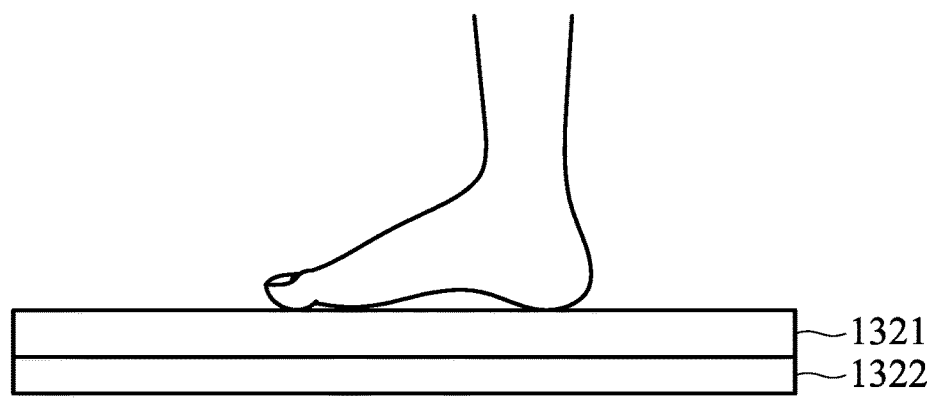
FIG. 13B shows a sectional view of the login pad 132 according to an embodiment of the present disclosure.

FIG. 13B shows a sectional view of the login pad 132 according to an embodiment of the present disclosure. In FIG. 13B, the login pad 132 is made of two layers 1321, 1322. The lower layer 1322 of the login pad 132 is implemented by NIR sensors. The upper layer 1321 of the login pad 132 is made of a transparent cover so that light emitted by the NIR sensors can pass through the upper layer 1321 to the soles of the feet of the user. In a practical embodiment of the login pad 132, the thickness of the NIR sensor layer is about 4 cm~5 cm, the thickness of the transparent cover is about 0.6 cm~1.5 cm, and of the login pad 132 is about 30×30 cm$^2$~40×40 cm$^2$. But the present disclosure is not limited thereto.

Various operations of embodiments are provided herein. The order in which some or all of the operations are described should not be construed as to imply that these operations are necessarily order dependent. Alternative ordering will be appreciated by one skilled in the art having the benefit of this description. Furthermore, it should be understood that not all operations are necessarily present in each embodiment provided herein. Also, it should be understood that not all operations are necessary in some embodiments.

Also, although the invention has been shown and described with respect to one or more implementations, equivalent alterations and modifications will occur to others skilled in the art based upon a reading and understanding of this specification and the annexed drawings. The invention comprises all such modifications and alterations and is limited only by the scope of the following claims. In particular with regard to the various functions performed by the above described components (e.g., circuits, sensors, receivers, transmitters, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the invention may have been disclosed with respect to only one of several implementations, such a feature may be combined with one or more other features of the other implementations as may be desired and advantageous for any given or particular disclosure.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. An interactive game system, comprising:
   a head-mounted device, worn by a user, wherein the head-mounted device executes a virtual reality program and displays video information of the virtual reality program to the user;
   a game suit, worn by the user and connected to the head-mounted device, wherein the game suit comprises a plurality of wireless sensors which are embedded on foot regions of the game suit and capable of receiving power;
   a battery, embedded on the game suit and used to provide power to the head-mounted device; and
   a ground pad, comprising a plurality of wireless charging devices that are arranged in a matrix and connected to a power outlet to provide power, wherein when the wireless charging device detects that some of the wireless sensors are approaching, position information of the approaching wireless charging devices is transmitted to the approaching wireless sensor and a signal indicating whether the battery needs to be charged is transmitted to the wireless charging device;
   wherein if the battery needs to be charged, the wireless charging device charges the battery via the approaching wireless sensors.

2. The interactive game system of claim 1, wherein each of the wireless charging devices comprises:
   two cover layers; and
   a sensing circuit layer, disposed between the two cover layers, wherein the sensing circuit layer comprises a coil in form of a circular shape for providing power to the approaching wireless sensors.

3. The interactive game system of claim 2, wherein each of the wireless charging devices further comprises:
   a pressure layer, disposed between the upper cover layer and the sensing circuit layer, wherein the pressure layer comprises at least one radial sensing electrode for detecting a touch or a contact on the wireless charging device.

4. The interactive game system of claim 3, wherein when the touch or the contact is detected, an overlap ratio between the approaching wireless sensors and the wireless charging device is calculated; and
   wherein when the overlap ratio is greater than a predetermined value, the wireless charging device is activated to provide power to the approaching wireless sensors.

5. The interactive game system of claim 2, wherein each of the wireless charging devices further comprises:
   at least one light sensor, disposed between the upper cover layer and the sensing circuit layer, wherein the at least one light sensor is used for detecting an overlap ratio between the approaching wireless sensors and the wireless charging device.

6. The interactive game system of claim 5, wherein when the overlap ratio is greater than a predetermined value, the wireless charging device is activated to provide power to the approaching wireless sensors.

7. The interactive game system of claim 1, further comprising:
   a login pad, connected to the ground pad, wherein when the user steps on the login pad, NIR sensors of the login pad captures foot vein images of the user; and
   wherein the foot vein images are used as an ID of the user.

8. A game suit that is interactive with a virtual reality program, wherein the virtual reality program is executed by a head-mounted device worn by a user, and the game suit comprises:
   a plurality of wireless power receivers, embedded on foot regions of the game suit and capable of receiving power from near-by wireless charging devices; and
   a battery, connected to the wireless power receivers and used for providing power to the head-mounted device, wherein when the wireless power receivers receive position information of the near-by wireless charging device, a signal indicating whether the battery needs to be charged is transmitted to the near-by wireless charging device;
   wherein if the battery needs to be charged, the near-by wireless charging device charges the battery via the wireless power receivers.

9. The game suit of claim 8, further comprising:
   an ECG (Electrocardiography) sensor, used to measure electrocardiography information of the user for projecting the user's current status to the corresponding virtual reality character.

10. The game suit of claim 9, wherein the electrocardiography information is used as an ID of the user.

11. The game suit of claim 8, further comprising:
    a plurality of infrared (IR) track points, used to provide the user's movement to the virtual reality program and to cause a corresponding virtual reality character of the virtual reality program to perform the same movement.

12. The game suit of claim 8, further comprising:
    a barometer, embedded on the ankle position of the game suit, wherein the barometer detects changes and estimates a corresponding altitude when the user jumps.

13. The game suit of claim 8, further comprising:
    a G sensor, used to measure an acceleration speed of the user, wherein the measured acceleration speed is transmitted to the head-mounted device executing the VR program.

14. A ground pad for providing power to a game suit worn by a user, wherein the game suit is interactive with a virtual reality program executed by a head-mounted device worn by the user, and the ground pad comprises:

a plurality of wireless charging devices that are arranged in a matrix and connected to a power outlet to provide power, wherein the wireless charging device detects whether wireless sensors embedded on foot regions of the game suit are approaching or not;

wherein when the wireless charging device detects that wireless sensors of the game suit are approaching, the wireless charging device transmits its position information to the approaching wireless sensors and receives a signal indicating whether the battery of the game suit needs to be charged from the approaching wireless sensors;

wherein if the battery needs to be charged, the wireless charging device charges the battery via the approaching wireless sensors.

15. The ground pad of claim 14, wherein each of the wireless charging devices comprises:

two cover layers; and a sensing circuit layer, disposed between the two cover layers, wherein the sensing circuit layer comprises a coil in form of a circular shape for providing power to the approaching wireless sensors.

16. The ground pad of claim 15, wherein each of the wireless charging devices further comprises:

a pressure layer, disposed between the upper cover layer and the sensing circuit layer, wherein the pressure layer comprises at least one radial sensing electrode for detecting a touch or a contact on the wireless charging device.

17. The ground pad of claim 16, wherein when a touch or a contact is detected, an overlap ratio between the approaching wireless sensors and the wireless charging device is calculated; and wherein when the overlap ratio is greater than a predetermined value, the wireless charging device is activated to provide power to the approaching wireless sensors.

18. The ground pad of claim 15, wherein each of the wireless charging devices further comprises:

at least one light sensor, disposed between the upper cover layer and the sensing circuit layer, wherein the at least one light sensor is used for detecting an overlap ratio between the approaching wireless sensors and the wireless charging device.

19. The ground pad of claim 18, wherein when the overlap ratio is greater than a predetermined value, the wireless charging device is activated to provide power to the approaching wireless sensors.

20. The ground pad of claim 14, further comprising:

a login pad, connected to the ground pad, wherein when the user steps on the login pad, NIR sensors of the login pad captures foot vein images of the user; and wherein the foot vein images are used as an ID of the user.

* * * * *